United States Patent [19]
Borggreve et al.

[11] Patent Number: 5,859,148
[45] Date of Patent: Jan. 12, 1999

[54] PREPARATION OF STAR-BRANCHED POLYMERS

[75] Inventors: Reinoldus J. M. Borggreve, Hulsberg; Ellen M. M. De Brabander-Van De Berg, Schinnen; Guido P. C. Beusen, Nuth, all of Netherlands

[73] Assignee: DSM N.V., Geleen, Netherlands

[21] Appl. No.: 403,962

[22] Filed: Mar. 15, 1995

[30] Foreign Application Priority Data

Mar. 16, 1994 [BE] Belgium .................................. 9400285

[51] Int. Cl.⁶ .......................... C08G 69/48; C08G 69/46; C08G 69/04; C08G 69/08
[52] U.S. Cl. .......................... 525/420; 525/432; 528/310; 528/323; 528/335; 528/342; 528/481; 528/503
[58] Field of Search ..................... 525/420, 432; 528/310, 323, 335, 342, 481, 503

[56] References Cited

U.S. PATENT DOCUMENTS

| | | | |
|---|---|---|---|
| 3,873,479 | 3/1975 | Zotov et al. | 524/13 |
| 4,250,299 | 2/1981 | Lehmann et al. | 525/420 |
| 4,345,052 | 8/1982 | Mumcu et al. | 525/420 |
| 4,429,081 | 1/1984 | Mumcu et al. | 525/420 |
| 4,558,120 | 12/1985 | Tomalia et al. | 528/363 |
| 4,568,737 | 2/1986 | Tomalia et al. | 528/332 |
| 4,631,337 | 12/1986 | Tomalia et al. | 528/391 |
| 4,734,464 | 3/1988 | Biensan | 525/420 |
| 4,876,328 | 10/1989 | Lubowitz et al. | 528/322 |
| 5,003,004 | 3/1991 | Simms | 525/68 |
| 5,010,136 | 4/1991 | Ohmae et al. | 525/66 |
| 5,047,478 | 9/1991 | Ohmae et al. | 525/183 |
| 5,047,479 | 9/1991 | Ohmae et al. | 525/183 |
| 5,079,307 | 1/1992 | Taylor et al. | 525/420 |
| 5,109,105 | 4/1992 | Lubowitz et al. | 528/322 |
| 5,155,159 | 10/1992 | Ohmae et al. | 524/436 |
| 5,254,668 | 10/1993 | Dominguez et al. | 528/323 |
| 5,292,808 | 3/1994 | Ohmae et al. | 525/113 |
| 5,310,943 | 5/1994 | Blyakman | 549/242 |
| 5,346,984 | 9/1994 | Hasegawa et al. | 528/323 |
| 5,493,000 | 2/1996 | Aharoni | 528/350 |
| 5,760,163 | 6/1998 | Fisch et al. | 528/310 |
| 5,773,555 | 6/1998 | Weger et al. | 528/310 |

FOREIGN PATENT DOCUMENTS

| | | |
|---|---|---|
| 0504108 | 9/1992 | European Pat. Off. . |
| 9208749 | 5/1992 | WIPO . |
| 9317060 | 9/1993 | WIPO . |
| 9321259 | 10/1993 | WIPO . |

OTHER PUBLICATIONS

Sax et al., *Hawley's Condensed Chemical Dictionary*, Eleventh Edition; Van Nostrand Reinhold; New York; 1987; p. 323.

Buhleier et al., "Cascade—and–Nonskid–Chain–Like", Synthesis of Molecular Cavity Topologies, Synthesis 158 (Feb. 1978).

*Primary Examiner*—Rabon Sergent
*Attorney, Agent, or Firm*—Pillsbury Madison & Sutro LLP

[57] ABSTRACT

The invention relates to a process for the preparation of star-branched polymers by reaction in the melt of a polymer having at least one hetero atom in the chain with a compound having at least three functional groups. Suitable polymers are for instance polyamides, polyesters, polyurethanes, polyoxyalkyls, polyimines and copolymers of these. Functional groups are for instance amine, carboxyl, hydroxyl, isocyanate and imine groups. The process is very fast and requires no special purification. The process enables star-branched polymers to be prepared which are derived from so-called AABB polycondensates.

17 Claims, No Drawings

PREPARATION OF STAR-BRANCHED POLYMERS

The invention relates to a process for the preparation of star-branched polymers. Various such polymers, consisting of an at least tri-functional core molecule from which emanate linear polymer chains, are described in the literature, but they have hardly found any technical application owing to the complicated methods of preparation that have been developed so far. In the known methods of preparation the monomer for the polymer chains is started from and the polymerization is initiated by the multifunctional core molecule. Examples of this are described in K. R. Gorda and D. G. Pfeifer, J. Appl. Polym. Sc. 50, 1977–83 (1993) and J. M. Warakomski, Chem. Mater. 4, 1000–04 (1992).

The first-mentioned publication describes the preparation of star-branched polymer on the basis of (di-)pentaerythritol as core molecule and initiator for the ring-opening polymerization of $\epsilon$-caprolactone to poly($\epsilon$-caprolactone) chains. This polymerization is carried out in the presence of stannous octate as catalyst. Nevertheless it takes at least 12 hours to achieve complete conversion of the caprolactone. Dimethylformamide is used as solvent, from which the star-branched polymer is recovered through precipitation in diethyl ether. In order to remove the dimethylformamide out of the product, repeated washing with large quantities of diethyl ether is required.

The second publication describes the preparation of a star-branched polymer on the basis of various polyethylene imines as core molecule and initiator for the ring-opening polymerization of $\epsilon$-caprolactam to poly($\epsilon$-caprolactam). This publication also mentions two other methods, starting from a core molecule with several carboxy acid sites at which the poly($\epsilon$-caprolactam) chains are formed through hydrolytic ring-opening polymerization, respectively from tris caprolactam as core molecule at which the star-branched polymer is formed through anionic polymerization of caprolactam.

The drawback of all these methods is that they take much time and require the use of very pure raw materials in order to prevent unwanted polymerization initiation. For instance, monomers and solvents have to be water free to a high extent. Also, an extensive purification step is required for the removal of residues of monomer and oligomer and/or solvent. A further restriction of the known processes is that they can only be used for polymers based on so-called head-to-tail monomer bonds and in the formation of which no low-molecular compounds such as water, methanol and ammonia are produced, which are products usually formed in polycondensation reactions.

The object of the invention is to provide a process for the preparation of star-branched polymers which does not have said drawbacks and is suitable for application on a commercial scale.

The inventors have succeeded in developing a process which is widely applicable and yields star-branched polymers in surprisingly short production times.

The process according to the invention is characterized by reaction in the melt of a polymer having at least one hetero atom in the chain with a compound having at least three functional groups.

Very surprisingly it has been found that full conversion to star-branched polymer takes place when a mixture of poly($\epsilon$-caprolactam), also called nylon-6, and 1,4-diaminobutane-N,N'-tetra-1-propylamine is extruded at 270° C. with a retention time of 3 minutes. Without any further purification the star-branched polymer thus obtained can be used for the manufacture of moulded articles, film or fibres.

The molecular weight of the star-branched polymer obtained can be varied by selecting the molecular weight of the polymer started from and/or the polymer: core molecule ratio. With an n-functional compound the molar ratio, on the basis of number average molecular weight, between the initial polymer and the compound will generally be chosen lower than the value n. The molar ratio preferably is less than (1/2)n.

In the case of a ratio $\leq 0.1n$ the mechanical properties of the star-branched polymer obtained are insufficient in general. By preference a ratio higher than 0.2n is chosen.

Optionally, the process according to the invention can be carried out in the presence of a catalyst. Suitable catalysts are for instance metal oxides, for instance antimony oxide, borates, acids, metal alkyls, for instance tetrabutyl titanate, phosphorus compounds, for instance triphenyl phosphite, phosphates and phosphonates.

Suitable polymers are polymers having at least one hetero atom in the chain. Examples of such polymers are polyamides, polyurethanes, polyesters, polyoxyalkylenes, polyimides and copolymers of these. Preferably, these polymers are only slightly branched or not at all.

The polyamides may have been obtained by polycondensation of di-acids and diamines or $\alpha,\omega$-amino acids, as well as by ring-opening addition of a lactam. Particularly suitable are polyamides derived from $\alpha,\omega$-amino acids and the corresponding lactams, for instance nylon-4, nylon-6, nylon-8, nylon-11 and nylon-12.

The polyesters may have been obtained by polycondensation of diols and di-acids or $\alpha,\omega$-hydroxy acids as well as by ring-opening polymerization of lactones. The group of polyesters is understood to include polysulphones and polycarbonates. Particularly suitable are polyesters obtained by ring-opening polymerization and polyesters derived from $\alpha,\omega$-hydroxy acids, for instance polylactones.

A suitable polyoxyalkylene is for instance polyoxyethylene, which, in the presence of cationic groups, which preferably are already present in the core molecule, brings about rapid conversion to star-branched polyoxyethylenes.

In principle all molecules having at least three functional groups can be used as core molecule, a functional group being understood to be a reactive group capable of reacting with a chain fragment which is released when fracture occurs at the hetero atom in the polymer comprising a hetero atom, in which reaction the chain fragment is coupled to the core molecule. The chain fracture is preferably initiated by the functional group of the core molecule. The functional groups of the core molecule can be chosen in dependence on the polymer with the hetero atom in the chain.

Suitable functional groups in general are hydroxyl or thiol, (carboxy) acid, epoxide, acid anhydride, acid chloride, nitrile, isocyanate, imine and amine groups, which are optionally substituted, and precursors thereof in so far as not already mentioned in the foregoing.

In the case of polyamides, high-boiling tris or higher functional amines or imines, for instance lysine, are used by preference. Special preference is given to dendrimer molecules, which bring about a spherical structure with little chain linkage. Highly suitable in this case are dendrimer amines of the formula:

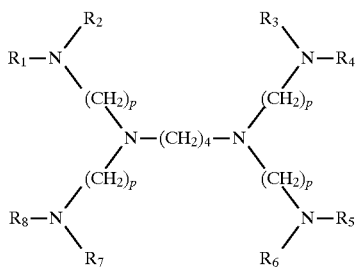

where $R_1-R_8 = -H, -(CH_2)_3-NH_2, -(CH_2)_3-N[(CH_2)_3-NH_2]_2$, etc. and p =1, 2, 3 etc. Preferably p is 6 at most.

According to the proposal for nomenclature in J. Pol. Sci., Part A, 31, 641–51 (1993) by G. Newkome et al. these are, in case p =3, 4-cascade:1,4-diaminobutane[4]:propylamine 8-cascade:1,4-diaminobutane[4]:(1-azobutylidene)[4]: propylamine 16-cascade:1,4-diaminobutane[4]:(1-azobutylidene)[12]: propylamine respectively, etc. dendrimers, These show very high reactivity and bring about full conversion of linear polyamide 6 to a star-branched polyamide within 3 minutes.

The precursor of this compound, comprising a nitrile group instead of $-CH-NH_2$, can also be used; (4-cascade:1,4-diaminobutane[4]: propionitrile etc.).

Besides the amines mentioned above, core molecules having 3 or more hydroxyl groups, for instance pentaerythritol and dipentaerythritol, as well as core molecules having 3 or more acid terminal groups, are also very suitable for the preparation of star-branched polyesters.

The process according to the invention is particularly suitable for polymers that have a high melting point. The melting point preferably is higher than 160° C., more preferably higher than 180° C. It is particularly advantageous if the melting point is higher than 200° C., in particular higher than 220° C.

The molecular weight of the polymer with a hetero atom in the chain may vary within wide limits. For instance, the number average molecular weight may vary between 10,000 and 100,000. If the molecular weight is low, the polymer-:compound ratio is preferably chosen higher, for instance between 1 and n. If the molecular weight is high, said ratio may be chosen lower, without causing the mechanical properties of the resulting star-branched polymer to be inferior to those of the starting polymer for the chains.

Star-branched polymers are distinguished by the following properties from the corresponding non-branched polymers having a corresponding number average molecular weight.

1. The viscosity of the melt is many times lower than that of the non-branched polymer having a corresponding total molecular weight. Warakomski reports a value higher than 6 for the ratio between the melt viscosity of linear polyamide 6 and that of star-branched polyamide 6 at 220°–250° C. The ratio between the intrinsic viscosities, however, is less than 2. This is attributed to the smaller giral diameter of the star-branched polymers.

2. The mechanical properties are comparable, although the elongation at break as well as the impact resistance are smaller for the star-branched polymer. This is to be attributed to the fact that in the star-branched polymers the length of the chains is smaller, while moreover the star-shaped structure makes interaction between the chains more difficult. If the chain lengths are becoming too short, which is for instance the case if the total molecular weight is too low or if the degree of branching is too high, the mechanical properties show a clear decline.

The process according to the invention can in principle be put into practice on all current types of melt mixing apparatus. Particularly suitable are twin-screw extruders in which very intensive mixing is accomplished.

The invention will now be elucidated by means of the following non-restrictive examples.

The following test methods were used for the characterization of the polymers.

| | |
|---|---|
| Notched impact resistance: ASTM D256, 23° C. | $kJ/m^2$ |
| Elongation strain test: ASTM 638, 23° C. | |
| yield stress | $N/mm^2$ |
| drawing stress | $N/mm^2$ |
| fracture stress | $N/mm^2$ |
| elongation at break | % |
| Three-point bending test: ASTM D790, 23° C. | |
| E-modulus | $N/mm^2$ |
| max. flexural load | $N/mm^2$ |
| Dynamic Mechanical Analysis: Rheometrics 800 plate/plate, 240° C., measured from high to low frequency. | Pa.s |
| $\eta°$ (melt viscosity) | |
| Differential Scanning Calorimetry: scanning rate 10° C./min up to 230° C.; heat of fusion (2nd heating curve) | J/g |
| Intrinsic viscosimetry: 25° C. in 90% formic acid (0.5 g/100 ml) ISO 307. Viscosity number, VGm and $\eta_{rel}$. | |
| Molecular weight determination (Mw): by means of gel permeation chromatography (GPC) with hexafluoroisopropanol as solvent and by means of light scattering measurement om 2 mol KCl in 0.5% formic acid, dissolution time 3 hours, and after filtration through a 0.5 m$\mu$ filter. | |
| Determination of terminal groups: titrimetric, mgeq/g. | |

EXAMPLE 1

Nylon-6 powder is pre-mixed with 0 to 5 wt. % 4 cascade:1,4-diaminobutane[4]: propylamine, (DAB(PA)$_4$), obtained by adding acrylonitrile to 1,4-diaminobutane through Michael's addition, followed by hydrogenation of the terminal nitrile groups, and melt-mixed on a Berstorff ZSE 25 twin-screw extruder (L/D=33) under the following conditions:cylinder temperature 200°–300° C., 300 rpm; throughput:2 kg/h under nitrogen in the hopper. Retention time about 3 minutes. On an Arburg injection-moulding machine the granulate is injection-moulded to test bars at a temperature setting of 240°–260° C., a mould temperature of 80° C. and a cycle time of about 47 seconds. The test bars were used for notched impact resistance and tensile strength tests. The melt viscosity, intrinsic viscosity and molecular weight were determined on the granulate by means of light scattering and gel permeation chromatography.

The characterization results for the various compositions are presented in Table 1:

| | | | | | | | |
|---|---|---|---|---|---|---|---|
| Nylon-6 | 100 | 99.975 | 99.95 | 99.5 | 99.0 | 98.0 | 95.0 |
| DAB(PA)$_4$ | 0 | 0.025 | 0.05 | 0.5 | 1.0 | 2.0 | 5.0 |
| IZOD | 6.1 | 5.9 | 5.7 | 6.0 | 6.1 | 5.6 | 5.6 |
| yield stress | 78 | 78 | 77 | 79 | 80 | 77 | 66 |
| elongation at | 63 | 48 | 41 | 35 | 41 | 34 | 36 |

| | | | | | | | |
|---|---|---|---|---|---|---|---|
| break | | | | | | | |
| E-modulus | 3000 | | | 2980 | 2980 | 2980 | 2650 |
| intrinsic viscosity | 3.42 | | | 2.70 | 2.52 | 2.48 | 2.27 |
| melt viscosity | 2700 | 2199 | 1559 | 560 | 390 | 300 | 170 |
| heat of fusion | 71.3 | | | 74.0 | 74.2 | 78.5 | 79.5 |

From this table it appears that with increasing DAB(PA)$_4$ content the melt viscosity of the nylon-6 decreases. The intrinsic viscosity also decreases.

The terminal group determination on the composition containing 1 wt. % DAB(PA)$_4$ shows the following results. The titrimetric terminal group analysis was performed after extraction of the granulate with methanol.

| | terminal group [meq/g] | | |
|---|---|---|---|
| | NH$_2$ | COOH | Mw |
| nylon-6[1]) | 0.036 | 0.035 | 53,000 |
| DAB(PA)$_4$ (1%) | 0.127 | (calculated) | |
| nylon-6 + 1 wt. % DAB(PA)$_4$ | 0.12 | 0.006 | 49,000 |

Extract 1.6 wt. %, linear nylon fragments (<10,000). With NMR no DAB(PA)$_4$ is found in the extract; apparently all DAB(PA)$_4$ has reacted.

The above results indicate that all DAB(PA)$_4$ is bound to the nylon. It also appears that the difference between the NH$_2$ and COOH terminal groups has remained virtually constant. The acid terminal groups have reacted virtually completely with free amine terminal groups of the DAB(PA)$_4$. If there had only been reaction with the COOH terminal groups, then on average approximately one amine group would have reacted per DAB(PA)$_4$ molecule. The molecular weight and the properties of the nylon would show no significant change in that case.

However, a very strong decrease of the melt viscosity occurs, from 2700 to 390 Pa.s, which is characteristic of the formation of a star-branched nylon. These phenomena could be attributed to the following mechanism. However the invention is not bound to any theoretical explanation.

In the melt, under the influence of the amine groups of the DAB(PA)$_4$ or otherwise, chain rupture occurs at amide groups in the polyamide chain. The fragment containing the carboxy groups reacts with an amine terminal group of the DAB(PA)$_4$, while the other chain fragment is amine-terminated. This takes place in accordance with the following reaction scheme:

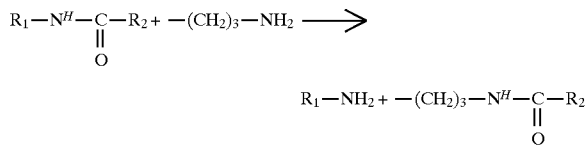

[1]AKULON F 135C from DSM, Netherlands, Mn = 27000, Mw = 53000

This reaction repeats until all free amine groups of the DAB(PA)$_4$ are occupied. In the case of DAB(PA)$_4$ a star-branched nylon will be formed in this way, with the nylon branches having an average length of about ¼ of those of the original nylon. Since rupture can occur at any place in the chain, there will be a wide spread in the lengths of the nylon chains of the star-branched polymer, by which it is distinguished from the star-branched nylons prepared according to the state of the art by controlled chain growth on the core molecule, which would show a relatively narrow molecular weight distribution.

From the variation of the mechanical properties it appears that if 5 wt. % DAB(PA)$_4$ is used, i.e. that if the length of the nylon chain in the branches becomes on average 15 to 20 times shorter than in the starting polymer, the mechanical properties decline, which is in agreement with the expectations regarding a star-branched polymer. The melt viscosity is very low then: about 15 times lower than that of the starting nylon.

EXAMPLE II

Example I is repeated, but instead of nylon-6, nylon-6,6*) is used now. Also in this case a decrease in melt viscosity is observed, as manifested for instance in an almost fivefold decrease in the die pressure of the extruder. The mechanical properties show a decline if the DAB(PA)$_4$ concentration ≧2 wt. %. This is to be expected since the molecular weight of the starting nylon is less high than that of the nylon 6 of example I.

*) Mn = 18,000, Mw = 33,000

EXAMPLE III

Polybutylene terephthalate* with 0.35 wt. % DAB(PA)$_4$ was extruded to granulate on a Werner and Pfleiderer ZSK 30 extruder with a cylinder temperature setting of 250° C., a speed of 225 rpm and a throughput of 14 kg/h. The melt viscosity again shows a strong decrease, in the presence of the 4-functional molecule.

* PBT, rel. visc. =2.00 (m-cresol), Mn=16500, Mw=34000

Aftercondensation of the low-viscous material obtained to a relative viscosity higher than the non-modified material does not result in a higher melt viscosity than that of the initial product.

EXAMPLE IV

Example II is repeated, but now using polyethylene terephthalate**, with a cylinder temperature setting of 270° C. Again the considerable melt viscosity decrease characteristic of star-branched polymers occurs. The mechanical properties of the branched polyester are of the same level as those of the linear starting polymer.

** PET, rel. visc. =1.60 (m-cresol), Mn=20,000, Mw=43,000

By means of the foregoing examples it has been shown that with application of the process according to the invention it is not only possible to prepare star-branched polymers with an AB polyamide or polyester in the chains, but also star-branched polymers with AABB-type polyamides and polyesters obtained via polycondensates of di-acids and diamines or diols, respectively, which is not possible with the techniques according to the state of the art.

To the average person skilled in the art it will be clear from the above examples that by choosing a different core compound and/or different polymers, a wide variety of star-branched polymers can be obtained, the choice of the polymer being determined by the possibility of chain rupture at the site of a hetero atom in the chain.

We claim:

1. A process for the preparation of a star-branched polyamide comprising
   providing a melt of a polymer having at least one hetero atom in the polymer chain and fracturing said polymer at the at least one hetero atom whereby at least one chain fragment is released, and reacting said at least one chain fragment with an organic compound having at least three identical functional groups that are capable of reacting with said chain fragment, wherein said polymer comprises at least one linear polyamide selected from the group consisting of polyamides obtained by ring opening polymerization of lactams and polycondensation of α,ω-amino acids, said linear polyamide having a number average molecular weight of between 10,000 and 100,000, and the functional groups of the organic compound are selected from the group consisting of amine, hydroxyl, thiol, carboxyl, acid anhydride, acid chloride, nitrile and imine groups.

2. A process according to claim 1, wherein the functional groups are selected from carboxyl, amine, or imine groups.

3. A process according to claim 2, wherein the functional groups are amine.

4. A process according to claim 2, wherein said functional groups are carboxyl groups.

5. A process according to claim 1, wherein the molar ratio, on a number average molecular weight basis, between said linear polyamide and said organic compound is between 0.1n:1 and n:1, wherein n represents the number of said functional groups on said organic compound.

6. A process according to claim 1, wherein said fracturing and reacting result from melt extruding said polymer in the presence of said organic compound.

7. A process according to claim 1, wherein said polymer comprises poly(epsilon-)caprolactam and said organic compound comprises 1,4-diaminobutane-N,N'-tetra-1-propylamine.

8. A process according to claim 7, wherein said polyamide and said organic compound are melt extruded at 270° C. with a retention time of 3 minutes.

9. A process according to claim 1, wherein the organic compound is a dendrimer.

10. A process according to claim 1, wherein said organic compound is represented by the formula

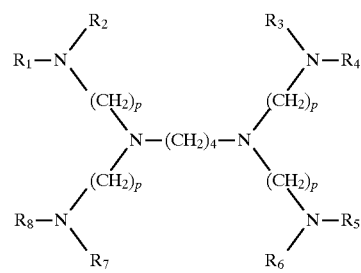

wherein $R_1$–$R_8$ are selected from the group consisting of—H, —$(CH_2)_3$—$NH_2$, and —$(CH_2)_3$—$N[(CH_2)_3$—$NH_2]_2$, and p is 1 or greater.

11. A process according to claim 10, wherein p is 1, 2, 3, 4, 5 or 6.

12. A process according to claim 1, wherein said organic compound comprises lysine.

13. A process according to claim 1 wherein the organic compound has 4 functional groups.

14. A process according to claim 1, wherein the polyamide is epsilon-polycaprolactam.

15. A process according to claim 1, wherein the melting point of the polymer is at least 180° C.

16. A process according to claim 15, wherein the melting point is at least 220° C.

17. A process for the preparation of a star-branched polyamide comprising melt-mixing at least one polyamide selected from the group consisting of polyamides obtained by ring opening polymerization of lactams and polycondensation of α,ω-amino acids, said polyamide having a number average molecular weight of between 10,000 and 100,000, under conditions effective to fracture the polyamide at a hetero atom in the polyamide whereby chain fragments are formed, said melt-mixing being conducted in the presence of an organic compound having at least three identical functional groups that are capable of reacting with said chain fragments, wherein said functional groups are selected from the group consisting of carboxyl and amine groups, whereby said star-branched polyamide is formed.

* * * * *